United States Patent [19]

Wally, Jr. et al.

[11] Patent Number: 5,644,644
[45] Date of Patent: Jul. 1, 1997

[54] FLOW CAMERA FOR LARGE DOCUMENT REPRODUCTIONS HAVING LENS ADJUSTMENT AND DOCUMENT FEED CONTROL MECHANISM

[75] Inventors: Joseph H. Wally, Jr., Overland Park, Kans.; David A. Huff, Raytown; Michael R. Huff, Excelsior Springs, both of Mo.

[73] Assignee: Black & Veatch Architects, Inc., Kansas City, Mo.

[21] Appl. No.: 510,589

[22] Filed: Aug. 2, 1995

[51] Int. Cl.[6] .................... G06K 9/00; G03B 27/48; G03B 27/54
[52] U.S. Cl. .................... 382/112; 382/325; 355/50; 355/51; 355/70
[58] Field of Search .................. 355/50, 51, 70, 355/27; 354/195.11; 382/100, 112, 325

[56] References Cited

U.S. PATENT DOCUMENTS

3,644,036  2/1972  Canfield ........................ 355/44
3,980,167  9/1976  Tamura et al. .................. 194/4
4,303,333  12/1981  Mechnick ....................... 355/27
5,341,192  8/1994  Wally, Jr. et al. ............... 355/50
5,450,709  9/1995  Steding ........................ 53/465

*Primary Examiner*—Jose L. Couso
*Assistant Examiner*—Matthew C. Bella
*Attorney, Agent, or Firm*—Hovey, Williams, Timmons & Collins

[57] ABSTRACT

A flow camera apparatus (10) operable for photographing large original documents in continuous, moving fashion includes a camera (74) located within the housing (12). An aperture adjustment mechanism (86) allows adjustment of the camera aperture from the outside of the housing (12) without opening the housing (12). The iris adjustment mechanism also allows the aperture to be changed during photographing of a document. The apparatus includes lamps (214, 216 and 218) for illuminating the document during photographing and a "T" mask assembly 22 provided with baffles (204 and 208) for allowing only light reflected from the document to enter the image path (88) to the camera (74). The apparatus (10) also includes precisely balanced detectors (126) for detecting entry of a document into the apparatus (10).

16 Claims, 6 Drawing Sheets

FLOW CAMERA FOR LARGE DOCUMENT REPRODUCTIONS HAVING LENS ADJUSTMENT AND DOCUMENT FEED CONTROL MECHANISM

BACKGROUND OF THE INVENTION

1. Field of the Invention

This invention relates generally to photo-reproduction and more specifically to the field of flow cameras that are operable to make miniaturized film images of wide or long originals as a prelude to digital scanning or projection of the film image using conventional photographic techniques and equipment. The flow camera photographs large original documents as they are moved continuously past the camera lens.

The invention in part relates to a flow camera having aperture adjustment mechanism which permits selective fine adjustment of the camera aperture from outside of the housing, and which is functional to allow aperture adjustment to be accomplished during photographing of a document. In addition, the invention concerns a flow camera having improved light means for illuminating the document during photographing, along with novel baffle means which allows only light reflected directly from the document to enter the image path to the camera. The invention further relates to improved detectors for precisely detecting entry of a document into the flow path of the flow camera and which serve to enhance correlation of document entry with initiation of movement of the roll, and to interrupt film movement after the image on the document has been fully photographed.

2. Description of the Prior Art

Flow cameras constructed in accordance with the teachings of U.S. Pat. No. 5,341,192, hereby incorporated by reference, represent a distinct advance in the state of the art of flow cameras. As those skilled in the art appreciate, such flow cameras allow the photographing for archival purposes of large documents such as drawings used in the manufacture of aircraft, automobiles and ships and in the fields of petroleum, right-of-way maintenance, seismology, and other similar large sized documents.

As alluded to in the '192 patent, even the largest film-making cameras with huge subject holders for displaying originals to an objective lens usually have two principle limitations. First, they are slow and cumbersome to load and unload. Second, they have a finite, maximum size for originals that can be reproduced. Long originals can only be done in sections. Flow cameras on the other hand, are easy to load and will accommodate originals of any length because they operate while the original is in motion, or "on the fly" so to speak. Flow cameras are much faster than a regular camera with a framed subject holder. More importantly, a flow camera can make a one-film image from an original of virtually any length.

Only a few miniaturizing filming cameras have ever been offered commercially, using either the flow principle or large stationary subject holders. This is believed to be attributable to the conceptual complexity of the requisite hardware, the difficulty in fabricating the equipment, the lack of effective control over the reproduction process, and the disparity in numbers between large and small originals requiring reproduction. There are only a small number of originals in the 4 to 30 feet category for example which require reproduction, while there are a much larger number of originals with shorter lengths. Economic considerations have therefore in large measure restricted development work on cameras capable of reproducing very large drawings on film. That fact however does not mean there is no need for a camera which can film long originals, and that at the same time, may be unusually wide. Long drawing roll lengths with widths of from 50 to 54 inches are not uncommon. Flow cameras can be easily scaled up to shoot 60 inches or more in width. The flow camera also offers optical advantages that cannot be matched in a conventional camera for reproducing long, large scale, and particularly long length drawings.

A flow camera as shown and described in the '192 patent introduced a feature wherein means was provided for lighting originals on both the front and back simultaneously. This resulted in making congruent images on the backs of the drawings available to the objective lens so that both front and back became part of the finished imagery. Lighting beneath the back of the document being reproduced also had the effect of sharpening the image of the front side of the drawing or the side facing the lens. However, under certain conditions of actual use of the '192 patent flow camera, an occasional aberration was detected in the form of double images or blurred images. These aberrations were particularly troublesome while filming certain types of original copy such as clear film positives of topography and seismic sections which contained a profusion of fine, thin lines. Localized blurring also tended to manifest itself in continuous tone photogrammetry like aerial strip maps.

These aberrations persisted even when the masking slit through which the image passed was adjusted to the minimum transverse width of about 12.7 mm in the center to about 19.05 mm at the ends of the slot longitudinally.

Empirically it was determined that light rays from the two top lights as used in the '192 patent camera, crossing in both directions underneath the exposure slit, in certain instances allowed light rays to bounce back off of originals, particularly those that had a glossy appearance, during the instant that the original was passing under the optical axis. It was found that even if the masking slit through which the image was viewed by the lens was reduced to as little as 9.5 mm, undesirable light bounce still occurred.

Many large originals advantageously requiring reproduction had characteristics which facilitated making image aberrations noticeable. They tended to have overall repetitive patterns which, if interrupted, showed obvious blemishes. These flaws were especially noticeable where the image covered most of the area, thus making any faults in the reproduction clearly evident.

Prior art flow cameras also presented problems with the numerous optical sensors used to detect documents as they passed through the transport mechanism of the camera. Two rows of these optical sensors were used to detect entry and exit from the exposure area.

Another problem with prior art flow cameras was the difficulty in changing the aperture of the objective lens of the camera. This required opening the housing in darkness and then removing and storing the unexposed film. Next, certain components had to be removed around the lens to gain access to the aperture and the aperture then adjusted. Finally, this process had to be reversed to reassemble the camera.

Flow camera operators were well aware of the time consuming nature of the aperture adjustment process. Even if the time was available though, some documents require adjustment during the filming process of a single document and such an adjustment is not possible with existing flow cameras.

SUMMARY OF THE INVENTION

The flow camera apparatus of the present invention solves the prior art problems discussed above and provides a distinct advance in the state of the art. More particularly, the apparatus hereof allows aperture adjustment from the outside of the apparatus while a document is being filmed, prevents aberrations in the image capture of certain types of documents, and eliminates the problems that tended to occur when a large number of optical sensors were employed to sense document entry, conveyance and ejection from the flow camera document path.

The preferred embodiment of the flow camera apparatus of the present invention includes an adjustable aperture mechanism for changing the aperture of the camera without opening the housing. Adjustment is accomplished using an adjustment knob positioned outside the apparatus housing. An adjustment rod extends through a wall of the housing and is enclosed, light-tight, in a flexible bellows allowing linear movement of the rod without allowing entry of ambient light into the camera compartment.

As shown for example in FIGS. 7, 8 and 13 of the '192 patent, two elongated florescent lights were provided between the slit defining optical tower and the document path defining glass plates. These upper tubes served to illuminate the top of a document as it passed between two glass plates which in part defined the document flow path. The optical tower had a mask plate directly above the upper florescent tubes presenting an hourglass-shaped slit which allowed light rays reflected from the original therebelow to be directed to the lens of the camera. The slit controlled the portion of the original which is photographed during the film exposure. Another florescent tube is provided below the glass plates for illuminating the underside of the document.

It was discovered that blurring and image aberration could in large measure be ameliorated by use of a hollow mask tower in association with the image illuminating lights which, in cross section, is shaped somewhat like a "T". The upright portion of the "T" has two horizontally spaced upright light blocking baffle panels which are positioned adjacent respective florescent tubes and define an open bottom located in proximity to and directly above the upper glass plate. The baffles in conjunction with the overlying support wall across the top of the "T" mask, functions to block light rays from passing directly to the upper portion of the mask. The horizontal wall across the top of the "T" tower has an hourglass-shaped exposure slit therein which serves the same purpose as the hourglass-shaped slit in the optical tower of the '192 patent, but is located in substantially greater spaced relationship from the document image than was previously the case.

The upright light blocking baffles of the "T" optical tower in conjunction with the remotely located image slit causes image defining light reflected from the portion of the original document directly under the exposure slit to be limited to a single image and there is no opportunity for a duplicate displaced reflection of more than one image to be directed onto the film from the original.

Another major improvement in the flow camera hereof over that disclosed in the '192 patent is complete elimination of belts for conveying original documents through the camera housing. In the '192 patent, there were a multiplicity of drive belts for transporting document copy beneath the imaging slit. These were present in four sets, i.e., upper entry belts, lower entry belts, upper exit belts and lower exit belts. Each pair of entry and exit belts passed over upwardly curved stainless steel plates which forced the drive belts to press against one another to the end that the drive belt sets served as the propulsion means for the original drawing. If these drive belts had been flat against one another, there would have been little or no contact with or pressure applied to the originals.

The improved drive structure of this invention includes upper rollers, each of which is provided with a series of circumferentially extending, peripherally projecting O-rings which cooperate with engaging rollers therebelow. The engaging rollers have cylindrical raised segments along the length thereof which are aligned with respective O-rings to provide a positive drive for original documents passing therebetween. The O-ring rollers and associated backup rollers allow the document traverse path to be of such limited overall length that there is very little impediment to safe passage of the document being reproduced along its path of travel.

Elimination of the belt drives also makes it possible to significantly reduce the fore-to-aft dimensions of the transport system. As a consequence, there is a significant reduction in the number of parts making up the flow camera with a resulting cost saving and simplicity of construction. In practice, the front to back drive path dimension can be as little as ½ to ⅓ of the distance required for the belt drive system of the '192 patent.

Additionally, the preferred embodiment includes a plurality of document sensors on the entry side of the imaging area only. The preferred sensors include carefully balanced, highly sensitive, lever arms that actuate respective proximity switches.

In the '192 patent flow camera, a number of optical sensors were employed to detect originals as they passed through the transport system and triggered movement of the film transport mechanism. There were two rows of the optical sensors. One set detected an original entering the exposure area and the second set sensed the exit of the original in order to detect completion of document passage and to turn off the film transport. Because of the delicate nature of the optical sensors, they were somewhat prone to failure. These optical sensors have been replaced with four small proximity switches, located in horizontally spaced relationship across the entry port of the document path.

The utilization of lever arms that operate proximity switches in the present invention permits utilization of a microprocessor which calculates the time interval of passage of the original beneath the exposure slit at a designated speed and to exit from the machine at the rear thereof. A second set of sensors is not required because computer calculations are employed to turn the film transport system off as a function of the time of passage of the trailing edge of the document image past the exposure slit, thus materially saving film.

DETAILED DESCRIPTION OF THE PREFERRED EMBODIMENTS

Figure 1:
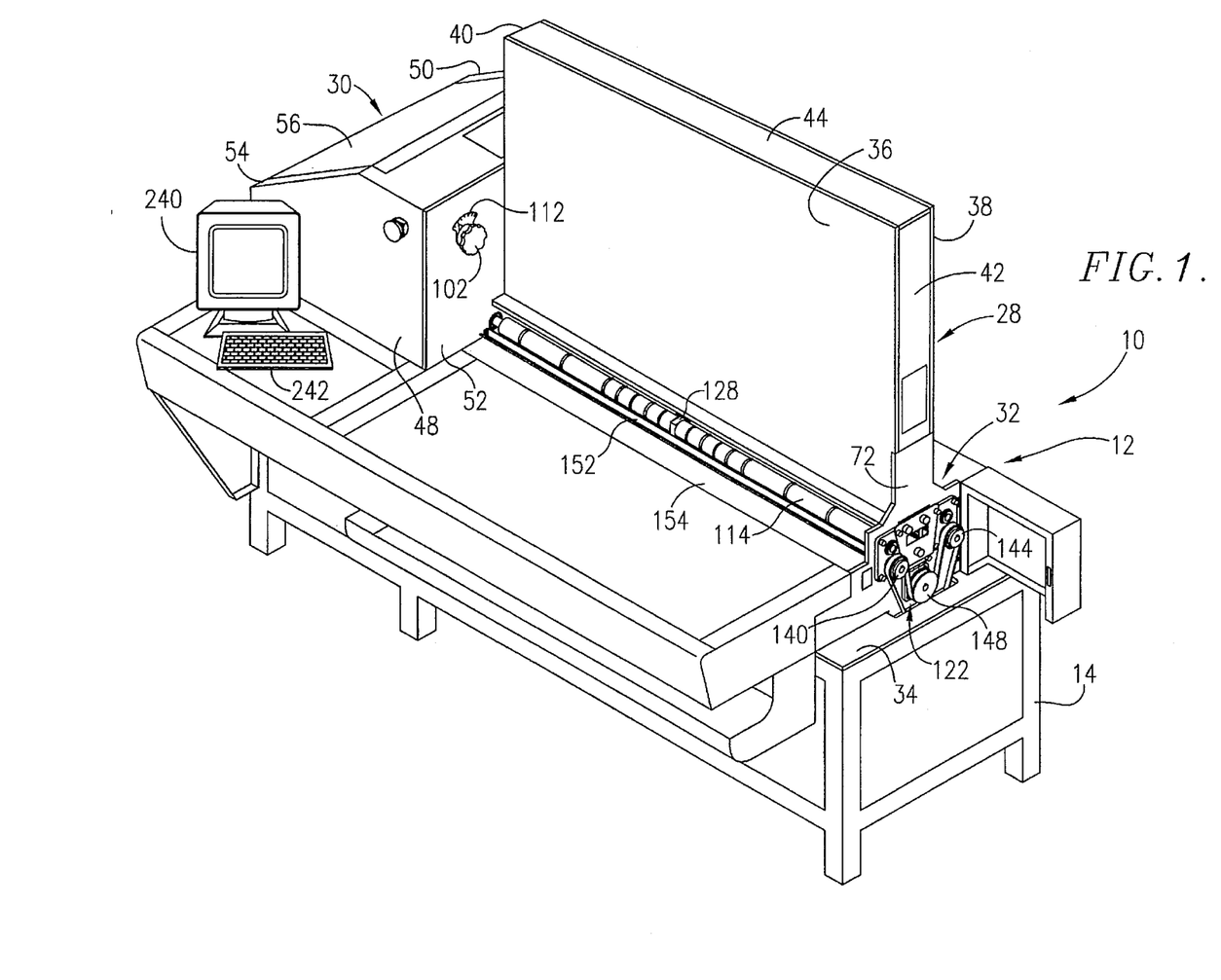
FIG. 1 is a perspective view of the preferred flow camera apparatus constructed in accordance with the present invention shown with the inlet cover removed.
Figure 2:
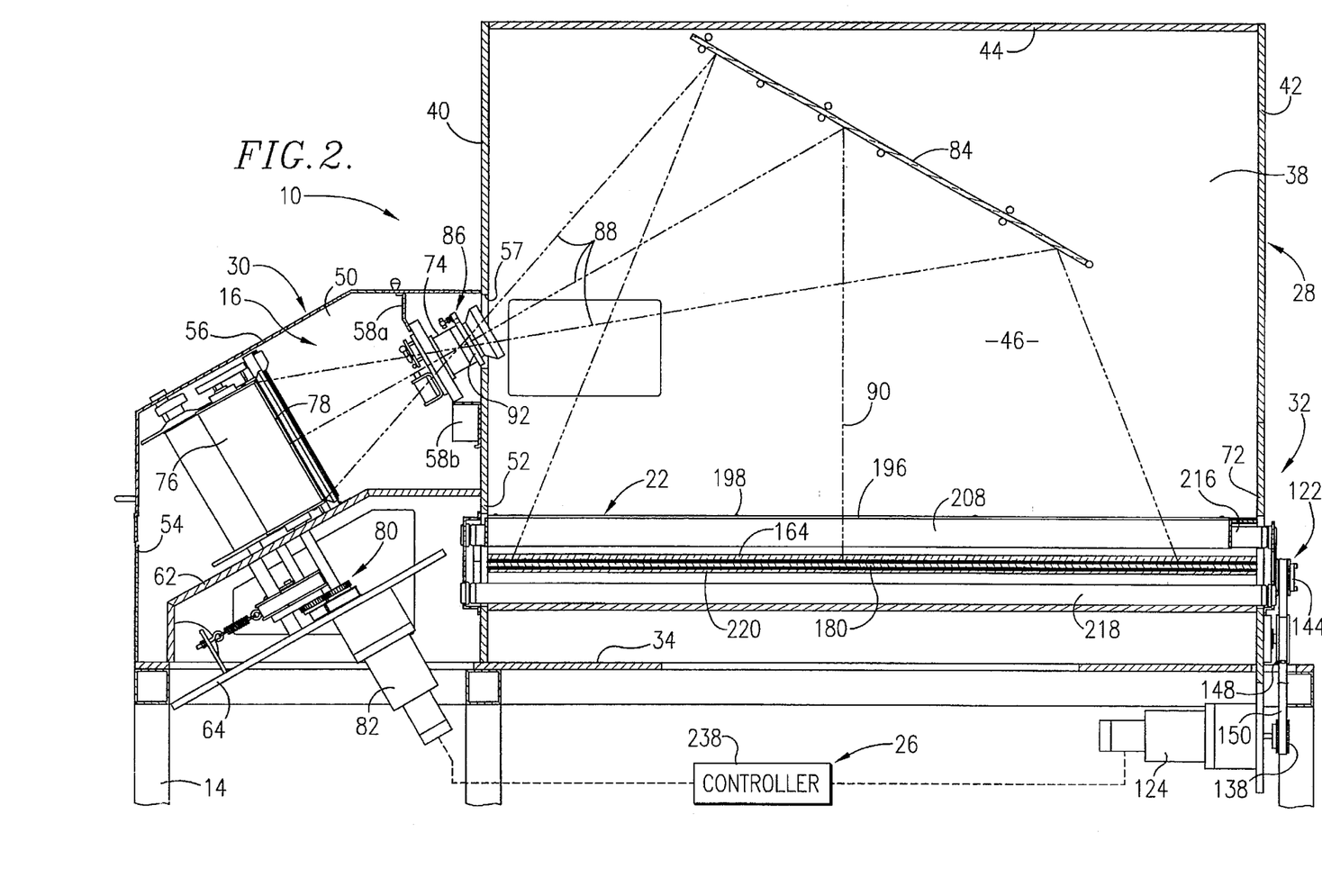
FIG. 2 is a side sectional view in partial schematic of the apparatus of FIG. 1.
Figures 8, 9, 10, 11:
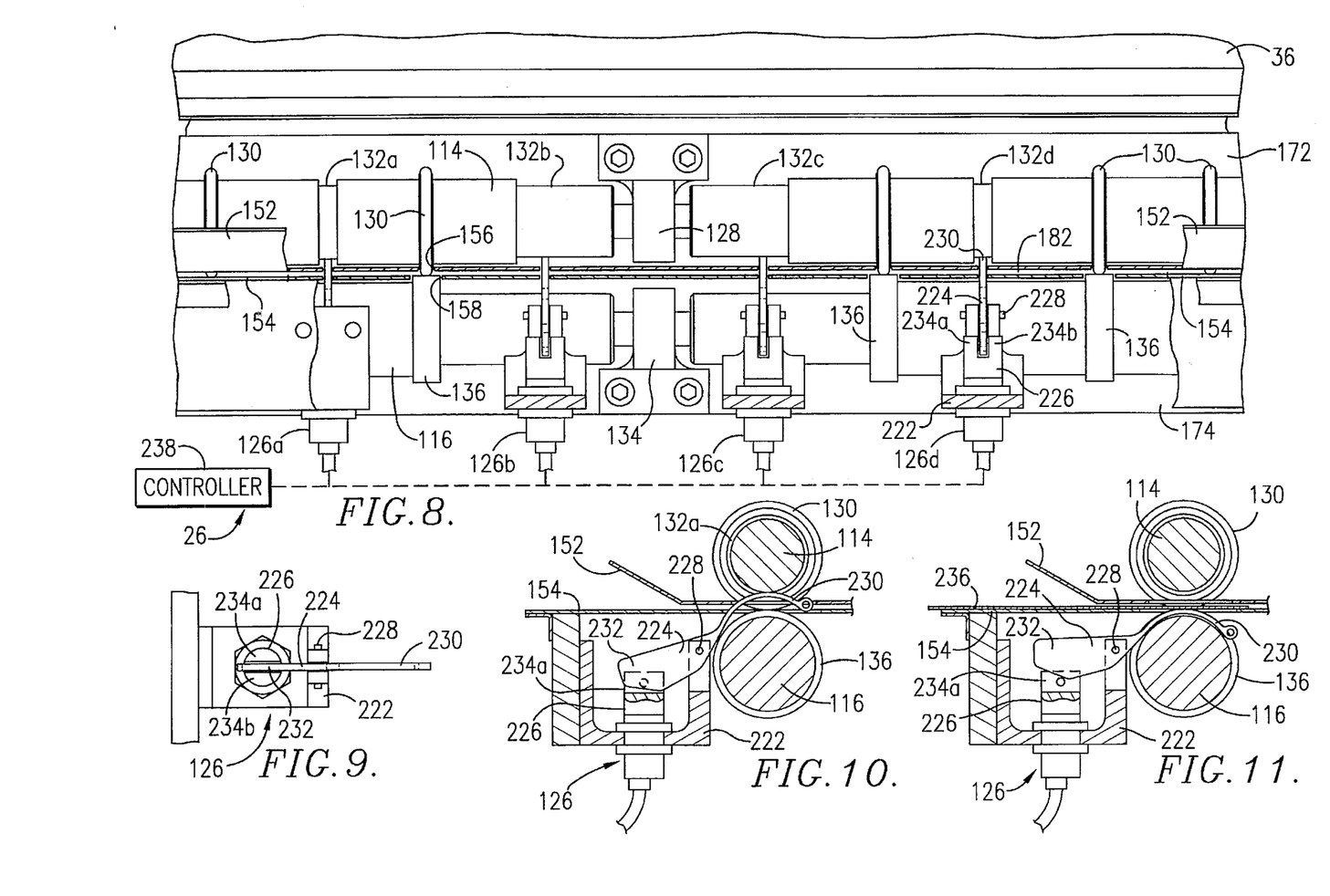
FIG. 8 is a partial, side sectional view of the entry rollers and document detectors and schematic representation of the controller of the apparatus of FIG. 1.
FIG. 9 is a plan view of a document detector of FIG. 8.
FIG. 10 is another partial, side sectional view of the entry rollers and document detectors of FIG. 8 showing a lever arm in the ready position.
FIG. 11 is a view similar to FIG. 10 but showing the lever arm in the detecting position.

The drawing figures illustrate apparatus 10 which is the preferred embodiment of the present invention. Apparatus 10 broadly includes housing 12 supported on table 14 (FIG. 1), camera assembly 16 (FIG. 2), transport mechanism 18 (FIGS. 4 and 8), document guide assembly 20 (FIG. 4), mask assembly 22 (FIG. 4), lighting group 24 (FIG. 4) and control system 26 (FIGS. 2 and 8).

Housing 12 includes optical tower component 28, camera lens and film compartment 30, document handling assembly 32 and horizontal base plate 34 forming a part of table 14. Optical tower 28 is positioned above document handling assembly 32 and includes front wall 36, rear wall 38, opposed end walls 40 and 42 and a top wall 44. These walls cooperate and are configured to define an optical chamber 46.

Figure 4:
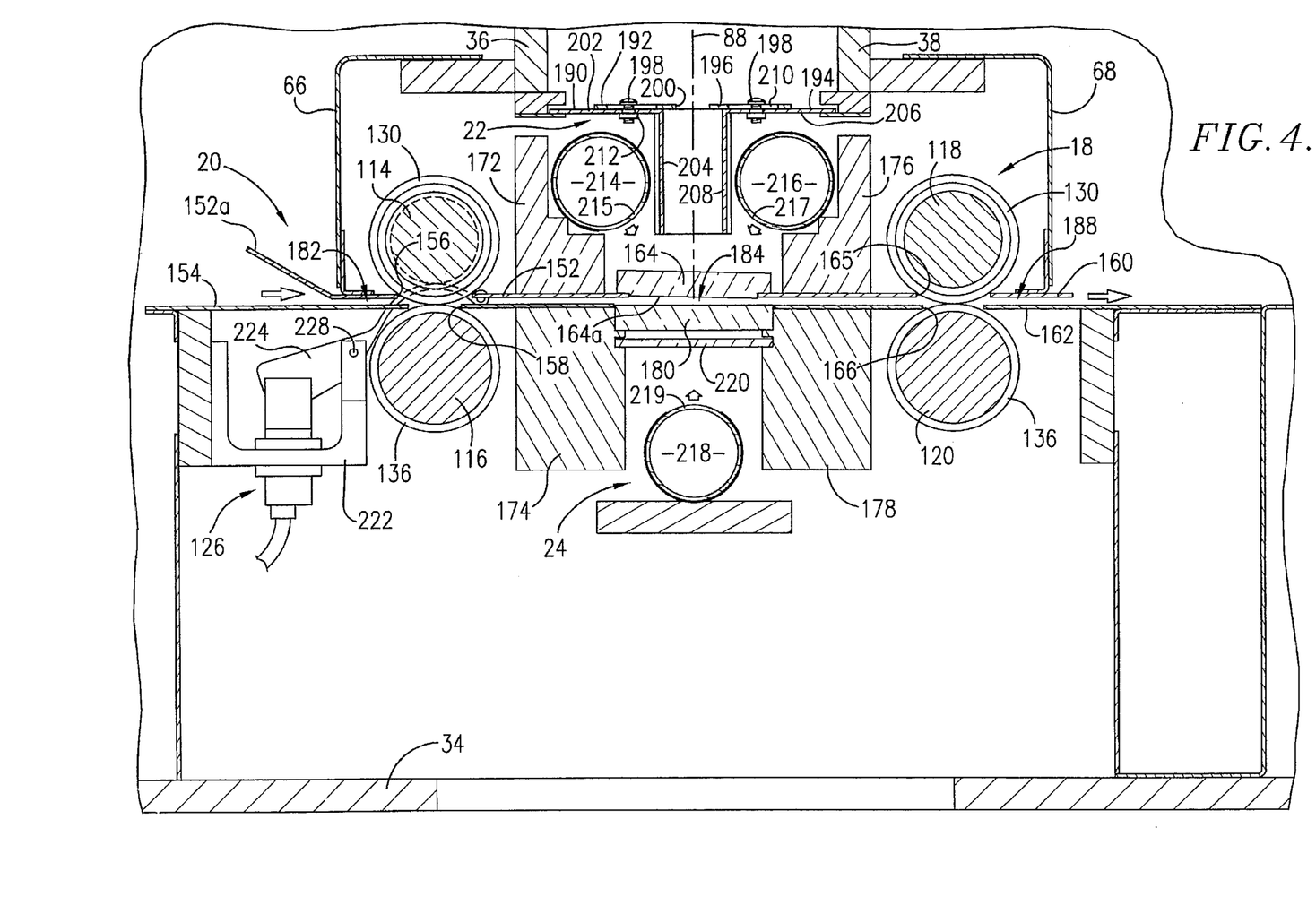
FIG. 4 is a partial, side sectional view of the apparatus of FIG. 1.

Camera lens and film compartment 30 is supported by base plate 34 and is positioned externally of the optical tower component 28 adjacent left wall 40. Viewing FIGS. 1 and 2, lens and film compartment 30 includes a front panel 48, a rear panel 50, an end panel 52, an opposed end panel 54 and a top panel 56. The end panel 52 is connected to and projects outwardly from end wall 40. It is to be observed from FIG. 2 that end wall 40 has a lens clearing opening 57 therein immediately below the horizontal portion of top wall 56 of compartment 30. Additionally, compartment 30 includes upper and lower lens supporting brackets 58a and 58b, left and right lens supporting walls 60a and 60b, bottom panel 62 and film motor support plate 64. As shown in FIGS. 1 and 4, document handling assembly 32 includes an inlet cover 66 and an outlet cover 68 and an outer upright trapezoidal-shaped end plate 72.

Camera lens and film assembly 16 (FIG. 2) includes lens unit 74, film supply 76 which includes roll film 78, film transport mechanism 80 driven by servo-motor 82, mirror 84 located in optical tower 28 and lens aperture adjustment mechanism 86. Components 74–84 are essentially the same as components 188, 190 and 212–230 illustrated and described in U.S. Pat. No. 5,341,192. Therefore the description and illustrations in the '192 patent are incorporated herein by specific reference thereto.

The broken lines in FIG. 2 hereof illustrate image path 88 from the document being photographed through tower 28 by way of mirror 84 and through lens 74 to film 78 with the optical axis 90 of lens 74 being the center of image path 88.

Figures 5, 6, 7:
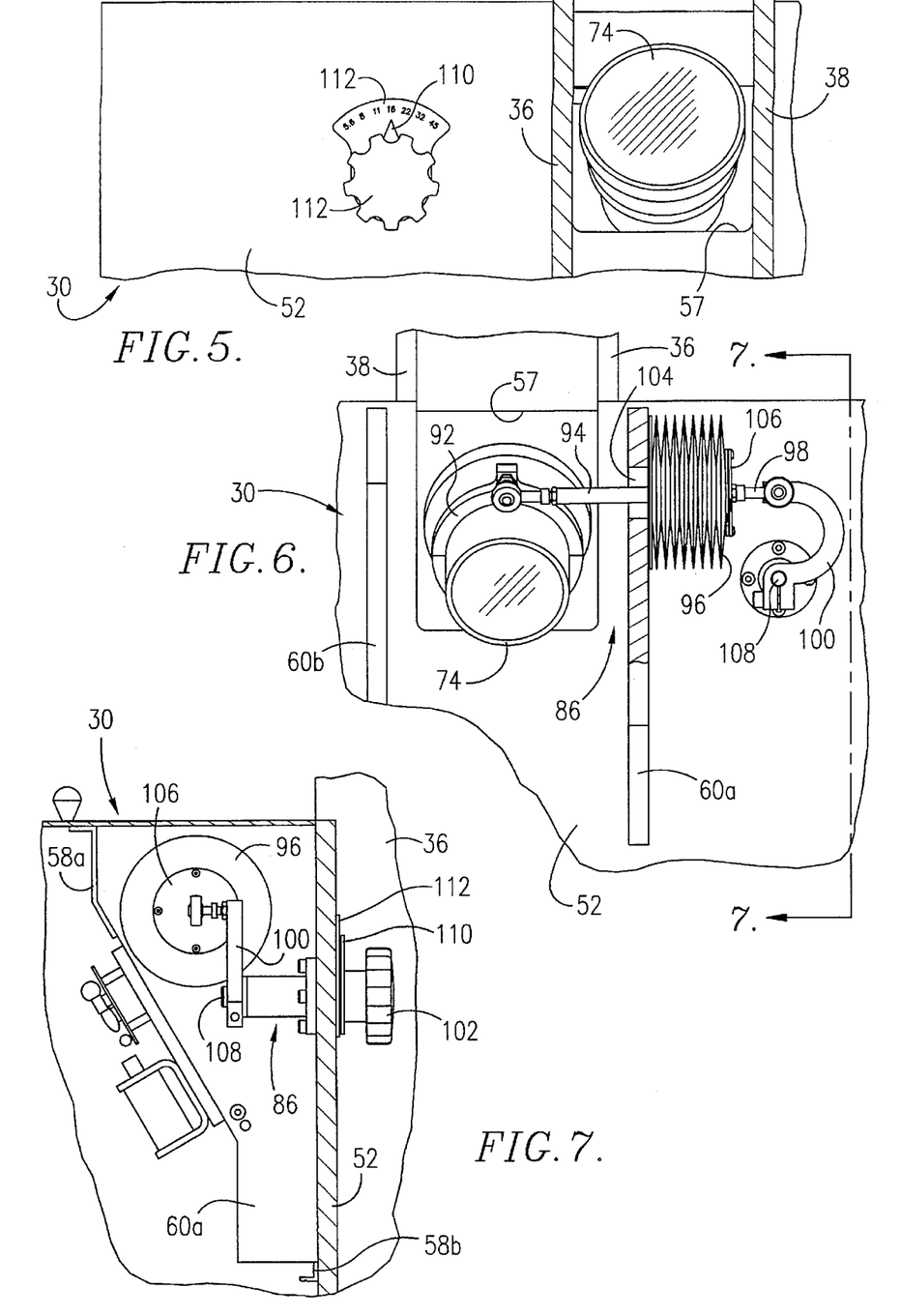
FIG. 5 is a partial side elevational view in partial section of the aperture adjustment mechanism for the camera of FIG. 1.
FIG. 6 is another partial side elevational view in partial section of the aperture adjustment mechanism of FIG. 5.
FIG. 7 is a view taken along line 7—7 of FIG. 6.

FIGS. 5–7 illustrate aperture adjustment mechanism 86 for lens 74 which includes a rotatable aperture ring 92, an adjustment rod 94, a bellows 96, a stub link 98, a rotation link 100 and a knob 102. The adjustment rod 94 extends through hole 104 in support wall 60a. The inboard end of rod 94 is rotatably coupled to aperture ring 92 with the outboard end of the rod 94 terminating on the outboard side of wall 60a. Linear movement of rod 94 results in rotation of aperture ring 92 to open or close the lens iris for changing the aperture of lens 74.

One end of tubular, flexible bellows 96 is secured light-tight to the outboard face of wall 60a in surrounding relationship to hole 104 and rod 94. The outboard end of bellows 96 includes a coupling disk 106 with the outboard end of rod 94 being attached light-tight to the interior surface of disk 106. Hole 104 would permit ambient light to enter the interior of lens and film compartment 30 if it were not for the provision of bellows 96 and associated disk 106. The flexible nature of bellows 96 allows linear movement of rod 94 through hole 104 while providing a light-tight seal about hole 104 and rod 94.

One end stub link 98 is connected to the exterior surface of disk 106 with the opposed end rotatably coupled with C-shaped rotation link 100. Aperture adjustment knob 102 is located outside of housing 12 and, in particular, on the exterior surface of right panel 52. Knob rotation shaft 108 extends through panel 52 and couples with rotation link 100. Rotation of knob 102 is articulated to provide a series of "clicks" or stops as indicated by arrow 110 on scale 112.

Rotation of knob 102 rotates link 100 which translates this movement into linear movement of stub link 98 and adjustment rod 94. Linear movement of rod 94 in turn causes rotation of aperture ring 92.

Figures 3, 12:
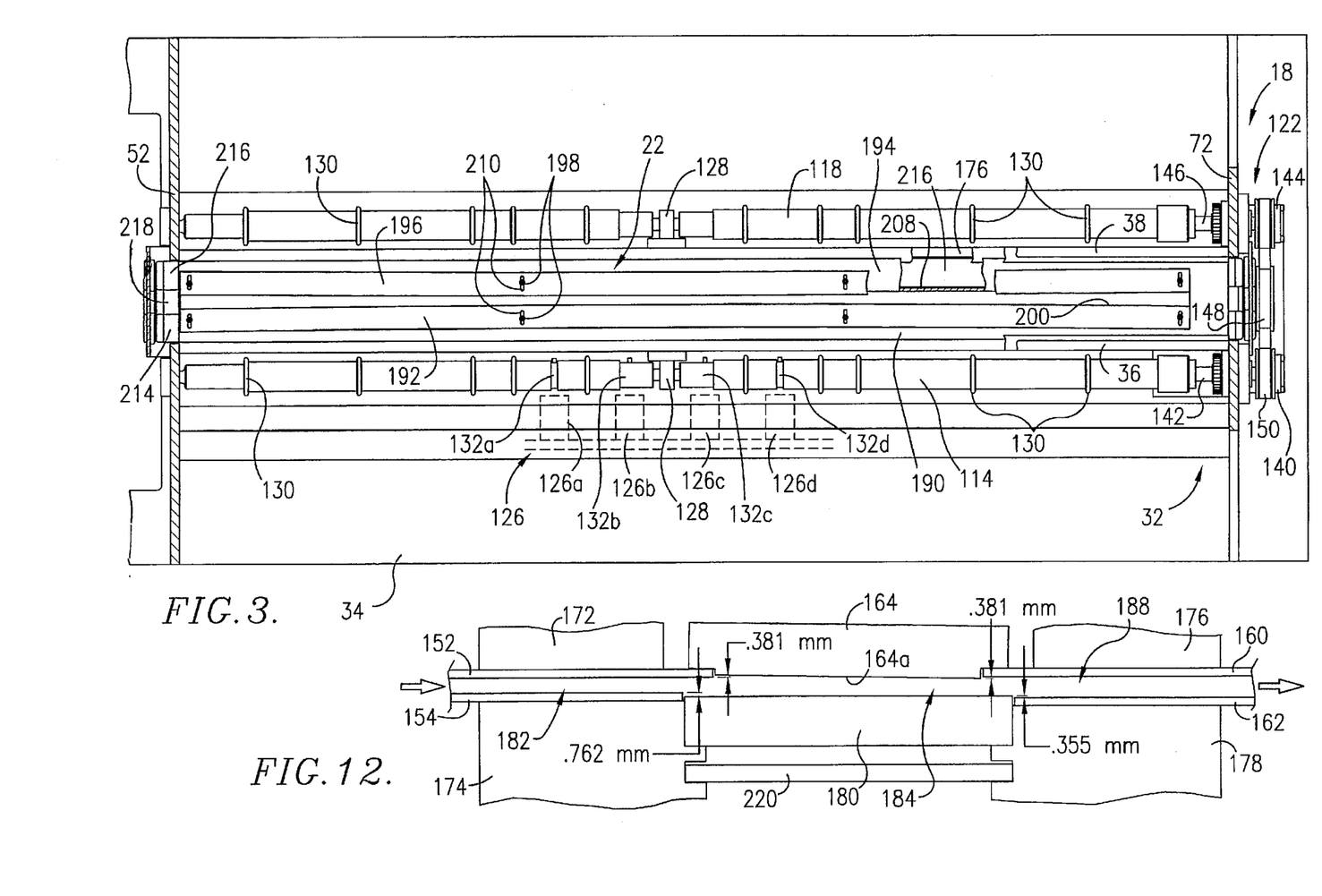
FIG. 3 is a partial plan sectional view of the apparatus of FIG. 1 showing the upper transport rollers with the document sensors represented in dashed lines.
FIG. 12 is a schematic representation of the orientation of directly opposed surfaces of the top and bottom glass guide plates with respect to the upper and lower metal guide plates associated with the glass plates, and indicating the clearances of respective edges of the glass plate and metal guide plates defining the document passage.

Referring in particular to FIGS. 2–4, transport mechanism 18 includes upper inlet roller 114, lower inlet roller 116, upper outlet roller 118, lower outlet roller 120, drive linkage 122, motor 124 and document entry detectors 126 individually designated as 126a, 126b, 126c and 126d. Cylindrical upper inlet roller 114 is rotatably carried by end panel 52 and opposed end plate 72, spans the distance therebetween and is also rotatably supported at its midpoint by bearing assembly 128. Roller 114 is located under inlet cover 66 and includes a plurality of spaced O-rings 130 along its length and four sensor slots 132a, 132b, 132c and 132d. Slots 132a and 132d are configured as grooves and slots 132b and 132c are configured as relieved sections on opposed sides of bearing 128.

Cylindrical lower inlet roller 116 is also rotatably carried by end panel 52 and opposed end plate 72, spans the distance therebetween, and is supported at its midpoint by bearing assembly 134. Roller 116 is positioned immediately below upper inlet roller 114 and includes a plurality of spaced, integral, raised backup counterforce rings 136 in registration and engaged by O-rings 130 which grasp and transport a document along the document passage through the machine.

Upper and lower outlet rollers 118 and 120 are configured the same as upper and lower inlet rollers 114, 116 respectively in that roller 118 has a series of O-rings 130 thereon in spaced relationship along the length of roller 118, and a plurality of integral, raised backup rings 136 strategically aligned with corresponding O-rings 130. The upper outlet roller 118 however does not include slots similar to sensor slots 132a and 132d. Outlet rollers 118 and 120 are located under outlet cover 68 and are positioned such that the O-rings on roller 118 in cooperation with backup counterforce rings 136 on roller 120 grasp and discharge the document from housing 12.

Drive linkage 122 includes drive pulley 138 (FIG. 2) coupled with the drive shaft of transport motor 124, driven pulley 140 coupled with shaft 142 of upper inlet roller 114 extending through end plate 72, driven pulley 144 coupled with shaft 146 of upper outlet roller 118 and idler pulley 148. Cogged drive belt 150 extends around cogged pulleys 138, 140, 144 and 148 as illustrated.

Document guide assembly 20 (FIG. 4) includes an upper inlet guide plate 152 and a lower inlet document support plate 154 in parallelism therewith. The outermost elongated edge 152a of guide plate 152 is bent upwardly at an angle of about 40° with respect to the horizontal and located outboard of the cabinet cover 66. The space between opposed surfaces of guide plate 152 and support plate 154 presents a document inlet passage 182 which leads directly to the image viewing area. A discharge guide plate 160 is horizontally aligned with guide plate 152, while support plate 162, which is in vertically spaced relationship from upper plate 160, is also essentially horizontally aligned with support plate 154. The space between guide plate 160 and support plate 162 defines a document outlet passage 188 therebetween.

The upwardly bent segment 152a of plate 152, in conjunction with the underlying plate 154, serve as a document guide leading directly into inlet passage 182.

Guide plate 152 and support plate 154 are provided with a series of inboard, elongated, vertically aligned slots 156 and 158 for clearing respective O-rings 130 on roller 114, and corresponding backup rings 136 of roller 116, as best shown in FIGS. 4 and 8. The guide plate 160 also has a series of inboard, elongated slots 165 therein while the document support plate 162 therebelow has a plurality of inboard, elongated slots 166 vertically aligned with slots 165. Slots 165 are strategically located to receive O-rings 130 on roller 118, while the underlying slots 160 clear backup rings 136 integral with roller 120.

An elongated glass plate 164 is positioned on and supported by opposed adjacent margins of the innermost edges of plates 152 and 160. As is most apparent from FIG. 4, glass plate 164 has elongated shoulder defining recesses in opposed lowermost edge margins thereof which receive respective innermost edge margins of guide plate 152 and discharge guide plate 160. A lower glass guide plate 180 is provided below upper guide glass plate 164 in direct alignment therewith, and is spaced therebelow a distance to present a document guide passage 188. Guide plate 180 is supported by horizontally spaced blocks 174 and 178.

There has been a problem in the past with document infeed and passage through flow cameras, especially in the case of documents that have been rolled into cylindrical shape for storage. The leading edges of such documents tend to jam upon encountering even the slightest obstruction.

In order to alleviate this problem, the passage 184 between opposed facing surfaces of glass guide plates 164 and 180 narrows as the passage 188 between guide plate 160 and support plate 162 is approached thus ensuring that documents smoothly pass through document guide assembly 20 and transport mechanism 18.

The upper glass plate 164 is tilted slightly such that the leading edge of the bottom of the glass at the point of a document's entry through inlet passage 182 is higher than the bottom of the trailing edge of support plate 152. The trailing edge of the bottom of glass plate 164 is lower than the bottom of the proximal leading edge of steel support plate 160.

It can be seen from the schematic representation of FIG. 12 that glass plate 164 tilts upwardly at its leading or entry edge and downwardly at its trailing edge. The glass plate 180 is also tilted as a result of the shoulder cuts which support the glass being of different depths. This tilt is solely achieved in the metal traversely extending support blocks 174 and 178. As previously explained, there are no shoulder cuts in the glass plate 180.

In a preferred construction, the depth of the recess in the leading edge of plate 164 is about 1.143 mm thereby causing the lower face 164a of plate 164 to be positioned about 0.381 mm above the lowermost face of guide plate 152, as shown schematically in FIG. 12. In like manner, the depth of the recess in the trailing edge of plate 164 is about 1.905 mm whereby the lower face 164a of plate 164 is situated below the adjacent lowermost face of document discharge plate 160 a distance of about 0.381 mm as indicated in FIG. 12. Thus, there is a slight tilt upward to plate 164 at the point where the document enters passage 184 by virtue of the fact that the front recess in plate 164 is not as deep as the rear recess therein.

Support block 174 is recessed to a depth of 8.763 mm to receive the proximal edge of glass plate 180, while support block 178 has a glass plate receiving recess which is only 7.645 mm in depth. This disparity in shoulder presenting recess depths is sufficient to cause the forward edge of plate 180 adjacent support plate 154 to be below the adjacent margin of that support plate a distance of about 0.762 mm. The recess in support block 178 which is not as deep as the lower plate receiving recess in block 174, the trailing upper edge of plate 180 is spaced above the adjacent margin of guide plate 162 a distance of only 0.355 mm. It can therefore be seen from FIG. 12 that a document conveyed along the path between glass plates 164 and 180 does not encounter any shoulders or other impediments to its movement, regardless of the thickness of such document.

"T" shaped mask assembly 22 (FIG. 4) has essentially horizontal cross plate structure, and a pair of depending, horizontally spaced, upright light blocking baffles. The assembly 22 is made up of an L-shaped member 190 which supports mask element 192, an L-shaped member 194 which supports mask element 196, and adjustment screw components 198 securing elements 192 and 196 to members 190 and 194 respectively. Components 190–196 extend the distance between end panel 52 and side plate 72. As viewed in FIGS. 3 and 4, member 190 and mask element 192 are positioned on the one side of image path 88, and member 194 and mask element 196 are positioned on the other side of image path 88. Mask elements 192 and 196 cooperate to define an hour-glass shaped image slit 200 therebetween.

Member 190 includes horizontal, support leg 202 and integral baffle plate 204 depending from the inboard edge thereof adjacent image path 88. The opposite member 194 includes horizontal support leg 206 and integral baffle plate 208 depending from the inboard edge thereof adjacent image path 88 on the opposed side thereof from baffle 204. The lower edges of baffles 204 and 208 are spaced a short distance (for example, from about 19 mm to about 25 mm, or even less) above upper glass guide plate 160 and thereby above any document present in image slot 184.

Referring to FIG. 3, mask elements 192 and 196 include transverse adjustment slots 210. Screws 198 are received respectively through slots 210 and through corresponding holes defined in support legs 202 and 206. Nuts 212 secure screws 198 as shown in FIG. 4. With screws 198 loosened, mask elements 192 and 196 can be shifted toward and away from one another as needed to create a desired width of image slit 200.

Of particular note is the manner in which the central portion of each mask element 192 and 196 can be shifted toward and away from each other while the outboard ends of each of the mask elements 192 and 196 remain in fixed positions relative to one another. This arrangement permits the hourglass shape of the image slit 200 to be varied at will and in a very inexpensive manner, both from the standpoint of initial fabrication of the flow camera 10, and also in use in the field. It is to be appreciated in this respect that the mask elements 192 and 196 may undergo required deformation thereof longitudinally as necessary to accommodate the degree of central area adjustment toward one another during setup of the slit shape. Screws 198 are then tightened to hold elements 192 and 196 in the selected positions.

Lighting group 24 includes upper, front lamp 214 located on the outboard side of baffle 204, upper rear lamp 216 located on the outboard side of baffle 208, lower lamp 218 and light diffuser 220 located between lower lamp 218 and lower glass guide plate 162. Lamps 214-218 are preferably florescent tubes spanning the distance between end panel 52 and side plate 72. As illustrated in FIG. 4, upper lamps 214 and 216 are located on opposed sides of image path 88.

Lamps 214, 216 and 218 are each desirably of the type known as apertured fluorescent tubes. They are usually furnished as custom tubes made to the customer's specifications, with a portion of the circumference of the glass envelope being left uncoated leaving a straight stripe of clear glass running the full length of the light fixture. These stripes or apertures are commonly available as 30°, 45° or 60° apertures. This designation refers to that portion of the 360° of a glass tube envelope that is not coated with phosphor.

Apertured fluorescent tubes generate light rays most of which exit through the clear aperture and not the balance of the envelope, making the light source exceptionally directional and much brighter in one direction than an ordinary fluorescent with similar size and characteristics. In view of the directional and brighter characteristics of the tube, apertured fluorescence are ideal for photographic purposes where an abundance of light is available. A preferred 45° apertured fluorescent tube for example, having a diameter of about 38.1 mm has a clear stripe glass running its full length which is approximately 17.5 mm in width.

It will be noted that the lower edges of baffles 204 and 208 extend slightly below the lower surfaces of upper lamps 214 and 216 respectively. With this arrangement, baffles 204 and 208 prevent light from upper lamps 214 and 216 from directly entering optical path 88. As discussed above, prior art flow cameras occasionally experienced aberrations in the captured images. The provision of baffles 204 and 208 of the present invention virtually eliminates these types of stray light aberrations.

Baffles 204 and 208 however do allow light emitted from each clear glass strip of lamps 214 and 216 to illuminate that portion of a document present in image slot 184 between glass plates 164 and 180. The overlap of light from lamps 214 and 216 is brightest in that portion of a document directly below image slit 200. Furthermore, baffles 204 and 208 allow reflected light from a document portion in image slot 184 to enter image path 88. In this way, only document-reflected light, which is the image to be captured, enters image path 88.

Referring to FIGS. 4 and 8-11, document entry sensors 126a-d are located on the document entry side of inlet rollers 114 and 116. Each sensor 126 includes a support bracket 222, a detector arm 224 and a proximity switch 226. Pivot pin 228 pivotally couples detector arm 224 with bracket 222 and defines an axis of rotation. Pin 228 allows body 224 to shift between the ready position shown in FIG. 10 and the detection position shown in FIG. 11.

Detector arm 224 includes an arcuate detector lever segment 230 on one side of pin 228 and a flag portion 232 on the opposed side of pin 228. Arm 224 is configured so that the counterbalance and switch actuating portion 232 presents a weight moment or mass greater than that of detector lever segment 230. As a result, counterbalance and actuating portion 232 biases segment 230 or arm 224 toward the ready position illustrated in FIG. 10. In the ready position, detector segment 230 of each arm 224 rides in a corresponding sensor slot 132a to 132d defined in upper inlet roller 114 above the juncture of upper and lower inlet rollers 114 and 116.

Four sensors 126a to 126d are preferably provided across the width of the entry opening for the documents so that a narrow original or a multiplicity of originals introduced at one time will trigger the transport mechanism independently of one another.

Preferably detector arm 224 is carefully balanced so that the net biasing force presented by counterbalance and switch actuating portion 232 is about 0.25 gm. As a result, sensors 126 are very sensitive and able to detect the entry of even very light and flexible paper into apparatus 10. The preferred technique for achieving the precise weight moment desired is to insert a short length of stainless steel dowel pin 3.175 mm in diameter by 8.636 mm long transversely through a complemental hole in counterbalance and switch actuating portion 232.

Proximity switch 226 (Baumer Electric Model No. FEG18.24.45L) includes a forked section presenting legs 234a and 234b. In the ready position illustrated in FIG. 10, counterbalance and switch actuating portion 232 of each arm 224 pivots between legs 234a and 234b. When a document 236 passes between inlet rollers 114 and 116, the document impinges upon detector lever segment 230 pushing it downwardly. In response, each of the counterbalance and switch actuating portions 232 contacting a document pivot upwardly from between legs 234a and 234b and cause a corresponding proximity switch 226 to be actuated.

Control system 26 is generally of the same construction and operates similarly to the control system illustrated and described in U.S. Pat. No. 5,341,192, which illustrations and descriptions are again incorporated herein by specific reference thereto. System 26 therefore includes a controller 238 coupled with monitor 240 and keyboard 242. Controller 238 is also coupled with document entry sensors 126a to 126d inclusive for receiving input therefrom and with camera servo-motor 82 and transport motor 124 for control thereof.

In operation, apparatus 10 is turned on and controller 238 activates lamps 214-218 and arms transport motor 124 for rotating upper inlet roller 114 and upper outlet roller 118. A time delay is in place in the microprocessor of about one-half second, before the transport takes off after at least one proximity switch has sent its signal. This prevents the camera from grabbing the original until the operator is ready for it to proceed. This delay may be shortened or lengthened by changing the program at the computer keyboard. The transport rollers are not in motion unless originals are being fed through.

To capture an image of a document, the user places the leading edge of document 236 into inlet slot 180 until the leading edge is received between inlet rollers 114 and 116 which grab the document and start feeding it through apparatus 10. When this occurs, document entry sensors 126 shift to their respective detecting positions whereupon proximity switches 226 respond to provide an input to controller 238 indicating that a document has entered apparatus 10. Activation of any one of sensors 126a to 126d is sufficient to trigger operation of controller 238. This provision allows the copying of narrow documents that might not otherwise activate a sensor.

The sequence of events in passage of a document through the transport roller system includes the following events. The document to be photographed is directed into throat 182 where the leading edge thereof presses against the upwardly protruding level segment 230 of each proximity switch 226 deflecting the lever portion 230 downwardly and causing a respective counterbalance and switch actuator portion to move a corresponding proximity switch 226. Actuation of the proximity switch(es) 226 initiates operation of rollers 114, 116, 118 and 120. However, the film transport servo motor 82 is not energized until the leading edge of the document is within about 50.8 mm of the optical axis of the camera which extends through the center of the "T" mask. The timing of this actuation is computer controlled, as is the deactivation, when the document has passed the exposure slit 200. Such timing is critical to saving photographic film as it would serve no useful purpose to have the film transport running when no original is being photographed.

This timing provides, however, for about 12.7 mm of marginal space between exposures on the film roll so that when the images are later cut apart there is no danger of cutting into the images proper. This timing may be adjusted for more or less space between frames by making program changes at the computer keyboard.

Document 236 passes through document guide assembly 20 until received between outlet rollers 118 and 120 which grab the document for propelling the document in cooperation with inlet rollers 114 and 116. When the trailing edge of document 236 passes beyond sensors 126, controller 238 begins marking the lag time for the document to exit the imaging area under optical axis 88. At the end of this lag time, camera servo-motor 82 is de-energized.

The manner in which images of the document are photographed and thereby transferred to the roll film 78 is explained in detail in the '192 patent and such explanation is incorporated herein from that patent by reference thereto.

Aperture adjustment knob 102 can be adjusted at any time by the operator from his normal operating position in a couple of seconds by opening the aperture in the objective lens to the desired F-stop. Film exposure in the flow camera may be controlled as the result of a composite setting involving the following:

1. Intensity of the two upper flourescent lamps 214 and 216 by a percentage of 0% to 100%;
2. intensity of the lower flourescent lamp 218 for backlight, again as a percentage of 100%;
3. Speed of transport through the machine as a percentage, 0% to 100% of a nominal maximum speed of 22 feet per minute;
4. Width of the slit 200 in the "T" shaped mask assembly 22, preferably fixed at 12.7 mm in the center and 19 mm at each end, curved gradually out from the center;
5. Insertion of or removal of a translucent neutral density or otherwise colored filter 220 directly above the bottom fluorescent tube 218 as a diffusing medium; and
6. Iris setting of the lens at F5.6, 8, 11, 16, 22, 32 and 45 with intermediate setting between each of the foregoing.

Therefore, the provision of a computer controller that makes possible simultaneous manipulation of speed variance, light intensity, the ratio of amount of light applied to the front and back or underneath the original being photographed, while at the same time maintaining the roll film moving at exactly the speed of a moving image, regardless of the transport speed of the original, accompanied by the ability to instantly change the F-stop setting externally of the camera and during filming if desired, results in the provision of a flow camera that has an output that is far superior to any previously available reproduction equipment for large originals.

For example, transparent originals such as film positives or mylar original tracings may suggest an exposure be carried out with minimal lighting and high speed of transport. On the other hand, a very discolored, dark or opaque original with heavy filling of lettering and lines may require maximum light and a very slow transport speed, in fact so slow, that to go from these two divergent originals, back to back without changing the aperture of the lens, would not be feasible. The range of change would be too extreme.

Even though the '192 patent flow camera provided for computer control of parameters such as lighting, transport and film speed, there was no means to readily vary the aperture setting without having direct access to the lens. To accomplish an aperture change as part of a major hardware adjustment as required by the '192 patent flow camera was not a viable option. In that prior flow camera, as much as five to eight minutes were required to change the aperture of the lens, instead of a few seconds. The significance of this factor to quality reproduction of originals is evident from the fact that to change one stop of the aperture either doubles the exposure or cuts it in half, depending on whether the aperture is being made larger or smaller. A change of one full stop increases or decreases the exposure by a factor of two, which is also desirable on occasions. Even greater aperture changes are required in certain instances to ensure faithful reproduction of a problem original.

These wide ranges of exposure settings may require increasing exposure by a factor of 2×, 4×, 8× or even as much as 64×, on a substantially instant basis. Opening a lens from an F-stop of 45 to an F-stop of F5.6 is tantamount to multiplying it 64 times.

In a conventional camera, changing the aperture results in a change in the optical characteristics of the lens. If the size of the original imposes too great a burden on the diagonal capacity of the lens at a given reduction, it is not feasible to open the aperture to compensate for lighting deficiencies or resolution is lost in the corners. Closing of a lens below F16 toward F22 in a regular camera is rarely an option because of the impracticality of long exposure.

Similarly, the cosine fourth losses attributable to the inability of any lens to resolve in the corners or at the perimeter as well as it can resolve in the image center contributes to unequal image resolution over the entire image area. Therefore, exposure of the film from the center of the lens image area toward perimeter points is unequal because of constantly diminishing exposure the farther the image area is from the center of the lens.

As pointed out in the '192 patent, the hourglass shaped slit 200 in "T" shaped mask 22, being wider at the ends than it is in the center, counteracts the natural cosine fourth losses in the lens. Furthermore, by virtue of the fact that the flow camera is capturing only a slit of image, and not an entire area image and this takes place across the narrowest dimension of the image, its diagonal capacity is usually almost twice the width of the image it is being asked to capture. In a word therefore, the recorded image in a flow camera design is in the "sweet spot" of the lens where the resolution is at its highest and the energy from the light is at its efficiency peak.

Consequently, the ability to change the aperture setting externally and instantly from document to document, and even during passage of a single document through the camera, provides an entirely new approach to flow camera operation and exposure control without jeopardizing image quality.

An original which is of uniform reflectivity over much of its surface but darker at one end represents an example of a document which lends itself to corrective exposure using only the adjustable, external aperture control. Many engineering drawings are darker on the right hand end because the title block end on the right gets more handling and thus becomes progressively darker. It is frequently possible to feed the left end or binding edge into the camera first at any selected aperture and then when the opposite and dirtier end gets near the exposure slit the next larger half stop or stop may be slowly and judiciously employed to give the darker end more light to make for greater uniformity throughout the exposure. This selective adjustment was not possible with previously available flow type camera.

As those skilled in the art appreciate, the present invention encompasses many variations in the preferred embodiment described herein. For example, the mask elements 192 and 196 defining image slit 200 can be located in positions between baffle plates 204 and 208, other than in the specific disposition illustrated in FIG. 4. Additionally, bellows 96 may be replaced by other equivalent structures presenting a light-tight seal while providing flexibility for component movement. Also, a CCD camera or other device for capturing an image electronically could be used in place of the presently preferred camera utilizing film. As a final example, other types of sensors could be used in place of detector arms 224.

Having thus described the preferred embodiment of the present invention, the following is claimed as new and desired to be secured by Letters Patent:

1. A flow image apparatus for capturing an image of a document, said apparatus comprising:

a housing;

an image capturing device located within said housing, presenting a field of view, and having a lens with an adjustable iris to vary the lens aperture, said housing including a wall positioned adjacent said device and an opposed outboard side;

means for moving a document through said housing for presenting the document in said field of view, said device including means for capturing an image of the document during movement of the document through said housing, said device including an adjustable aperture mechanism for changing the lens iris of said device, said mechanism including a rotatable aperture ring for changing the iris of said device during rotation of said ring, an elongated adjustment rod having one end coupled with said ring and an opposed second end extending through a hole in said wall, said hole being of sufficiently larger diameter relative to the cross-sectional diameter of the rod to compensate for side-to-side movement of the rod during rotation of the ring by the rod, a coupling assembly coupling said second end with manually manipulable adjustment structure, said manually manipulable adjustment structure including a rotatable knob, said coupling assembly including means for translating rotation of said knob into generally linear movement of said rod, said housing being subject to entry of ambient light through said hole, said mechanism further including a flexible, tubular body coupled light-tight with said outboard side of the housing in surrounding relationship with said hole and rod and coupled light-tight with said rod adjacent said second end, said coupling assembly further including a shaft supporting said knob and extending into the housing, and a C-shaped rotational pivotally connected to the knob shaft and to the adjustment rod, the portion of the C-shaped rotation link presenting an entrance opening thereto facing the tubular body to receive the latter as said one end of the rod and thereby the part of the tubular member connected thereto are moved toward the rotation link whereby the iris may be adjusted from outside of said housing even though the lens iris is not directly accessible.

2. The apparatus as set forth in claim 1, said adjustment means including means for adjusting said mechanism during movement of the document through said housing.

3. The apparatus as set forth in claim 1, wherein said coupling assembly includes components for shifting the aperture defining iris of lens through an arc that is directly related to a specific arc of rotation of said knob, and means on the housing associated with said knob comprising a series of indicia and presently clock stops directly correlated with F-stop settings of the lens iris.

4. A flow image apparatus for capturing an image of a document, said apparatus comprising:

a housing;

an image capturing device located within said housing and presenting a field of view;

means for moving a document through said housing for presenting the document in said field of view, said device including means for capturing an image of the document during movement of the document through said housing;

structure defining an elongated path for the image between the document and said device;

a mask having a slit located transversely of said image path between the document and said device and configured for restricting said field of view to a portion of the document;

at least one lamp adjacent said mask and the document to one side of the image path and positioned for illuminating with light at least said portion of the document;

a baffle positioned between said mask and the document and between said lamp and said image path for allowing only light reflected from the document to enter said image path; and means coupling said baffle with said mask, said baffle presenting a distal edge, said baffle extending from said mask toward said document with a space between said distal edge and the document.

5. The apparatus as set forth in claim 4, said lamp presenting a surface portion adjacent said mask and an opposed surface portion, said opposed surface portion and distal edge being positioned in the same plane.

6. The apparatus as set forth in claim 4, wherein said mask is of generally "T" shape configuration.

7. The apparatus as set forth in claim 6, wherein said "T" shaped mask has upper cross plate structure defining the top of the "T", said cross plate structure having means defining said slit.

8. The apparatus as set forth in claim 4, said lamp being a florescent tube.

9. The apparatus as set forth in claim 4, said image capture device including a camera using photographic film for capturing an image of the document.

10. The apparatus as set forth in claim 4 further including a pair of said lamps and a pair of said baffles positioned on opposed sides of said slit and on opposed sides of said portion of the document.

11. The apparatus as set forth in claim 4, wherein said mask is provided with a pair of elongated transversely spaced flexible elements, and means for adjustably affixing the elements in relative disposition opposite one another for defining said slit therebetween, said adjustable means including components permitting the elements to be moved toward and away from one another to a selected extent throughout the length thereof.

12. A flow image apparatus for capturing an image of a document, said apparatus comprising:

a housing;

an image capturing device located within said housing and presenting a field of view;

means for moving a document through said housing for presenting the document in said field of view, said device including means for capturing an image of the document during movement of the document through said housing; and detecting means for detecting entry of a document into said housing, said detecting means including a shiftable detector member shiftable between a ready position in the path of a document entering said housing and a document detecting position shifted away from said ready position, means for biasing said member toward said ready position, sensing means for sensing when said member shifts to said detecting position thereby indicating entry of the document into said housing; and said detecting means including a detector arm pivotable about an axis, said detector arm presenting said detector member on one side of said axis and presenting a counterbalance portion on the opposed side of said body, said counterbalance portion presenting a weight moment greater than the weight moment of said detector member and thereby presenting said biasing means.

13. The apparatus as set forth in claim 12, said sensing means including a proximity switch positioned in actuatable relationship with said counterbalance portion.

14. The apparatus as set forth in claim 12, said detector arm being configured so that the difference between said weight moments is about 0.25 gm.

15. The apparatus as set forth in claim 12, said device including a camera operable for capturing an image of the document on photographic film.

16. The apparatus as set forth in claim 12, said device including a unit for capturing sequential digital electronic signals representative of the image of the document.

* * * * *